Patented Mar. 29, 1932

1,851,754

UNITED STATES PATENT OFFICE

AUGUSTUS EDWARD CRAVER, OF NEW YORK, N. Y., ASSIGNOR TO WEISS AND DOWNS, INC., OF NEW YORK, N. Y., A CORPORATION OF NEW YORK

PROCESS OF PRODUCING FORMALDEHYDE

No Drawing.   Application filed January 13, 1928.   Serial No. 246,654.

This invention relates to improvements in the process of producing formaldehyde when methyl alcohol vapor is subjected to oxidation by oxygen either alone or admixed with other gases in the presence of a catalyst.

I am aware that the vapor phase catalytic oxidation of methyl alcohol to formaldehyde has been described before, but the following disclosure of my invention will make clear the improvements which I have effected in the composition of cataysts for this purpose.

In the catalytic oxidation of methyl alcohol we are not alone concerned with the oxidation of methyl alcohol to formaldehyde, but also with two other reactions capable of ensuing simultaneously which are of great importance and which exert a great effect on the ultimate yield of formaldehyde possible from the methyl alcohol employed, namely,

1. $CH_3OH + 2O = HCOOH + H_2O$
2. $CH_3OH + 3O = CO_2 + 2H_2O$

Equations 1 and 2 represent a loss of methyl alcohol, and a catalyst for the commercial manufacture of formaldehyde must be one in which these two reactions are eliminated or at least reduced to a negligible amount.

The oxidation of methyl alcohol to formaldehyde by a catalyst may be considered as a very slow burning or combustion of the methyl alcohol which, due to the inherent properties of the catalyst, is arrested at the intermediate stage at which formaldehyde is produced and is therefore not permitted to progress further to form formic acid or ultimately complete combustion.

In general, I have found that a catalyst whose inherent characteristics have been so changed as to give practically no complete combustion, as typified by Equation 2, will also give practically no formic acid production. This is a decided advantage for several reasons: (1) the saving of methyl alcohol; (2) the non-corrosion of the condensing equipment; and (3) the prevention of the formation of methyl formate which is an undesirable contaminant. Thus the discovery of a method of so modifying a catalyst for the manufacture of formaldehyde from methyl alcohol as to substantially suppress the complete combustion is of extreme practical importance.

I am aware that vanadium oxide has been proposed as suitable for the catalytic oxidation of methyl alcohol to formaldehyde, but vanadium oxide in the pure or substantially pure form is not an efficient catalyst for this reaction. Regardless of how it is prepared and used, vanadium oxide occasions a substantial amount of complete combustion (carbon dioxide and water) and likewise a considerable formic acid formation, along with the formation of formaldehyde. The fact that vanadium oxide does not stop entirely at this intermediate formaldehyde stage in the catalytic oxidation of methyl alcohol is due to some inherent property in vanadium oxide, perhaps due to its electronic structure or to some other physico-chemical property peculiar to vanadium oxide, although I cannot definitely set forth any specific theory.

I have also investigated a large number of other pure oxides for the catalytic oxidation of methyl alcohol to formaldehyde, among them being the oxides of molybdenum, uranium, tin, chromium, tungsten, manganese, copper, cobalt, lead, bismuth, cerium and tantalum, adjusting the running conditions so as to obtain those most favorable for the production of formaldehyde. Cobalt oxide, cerium oxide, tantalum oxide, lead oxide, bismuth oxide and tin oxide gave only relatively low productions of formaldehyde, while the remaining oxides listed above gave somewhat larger formaldehyde productions, (manganese oxide giving the highest), but with each of these oxides the complete combustion of the methyl alcohol was excessively high, even much greater than that occurring with vanadium oxide. Since, however, vanadium oxide seemed to be the most promising oxide from the standpoint of its formaldehyde formation, I endeavored to find some means of so modifying vanadium oxide as to suppress the complete combustion property of the latter and thereby cause it to stop at the formaldehyde stage when used in the oxidation of methyl alcohol to formaldehyde.

I have discovered that comparatively small amounts of various metallic oxides, when admixed with vanadium oxide, act as a depressor or eleminator of the complete combustion usual with vanadium oxide, thereby producing a catalyst which is practically entirely formaldehyde-forming, and causing the formation of complete combustion and formic acid in only negligible amounts.

This ability to depress the complete combustion of vanadium oxide I have found is possessed by a surprisingly large number of metallic oxides and as far as I can deduce, seems to be utterly independent of any chemical or physical relationship existing between them. Furthermore, the ability of any metallic oxide which when admixed with vanadium oxide to depress the complete combustion property of vanadium oxide is not predictable as it will be seen in the list given later that metallic oxides, other than vanadium oxide, which in themselves in the pure form cause considerable combustion of methyl alcohol to formaldehyde, will when admixed with vanadium oxide even in comparatively small quantities, exert a powerful combustion depressing action in the vanadium oxide mixture.

For the sake of convenience, I am arbitrarily using the term "combustion retarder", which term will appear in the claims, to define those metallic oxides which I have discovered will, when admixed with vanadium oxide, depress the complete combustion property of the vanadium oxide when used for the vapor phase catalytic oxidation of methyl alcohol to formaldehyde.

I have found the following oxides to be very effective in depressing the complete combustion property of vanadium oxide when admixed with the latter, these oxides being the "combustion retarder" described above, namely, the oxides of manganese, sodium, potassium, lithium, magnesium, barium, strontium, calcium, cerium, nickel, tin, silver, lead, phosphorus, thorium, lanthanum and thallium, and only these metallic oxides just mentioned are to be included under the category of "combustion retarder" when the latter term appears in the claims although it is understood that mixtures of two or more of these metallic oxides may be employed in mixture with vanadium oxide instead of a single one of them. With the exception of manganese and nickel, these metals are all contained in the first five groups of the periodic system.

I have investigated the effect of adding to vanadium oxide such metallic oxides as tungsten oxide, uranium oxide, molybdenum oxide, iron oxide and such metals as platinum and iridium but have found these materials to possess no pronounced combustion depressing action on vanadium oxide and in some cases they greatly increased the complete combustion of the methyl alcohol.

In general, I have found that the best results are obtained by admixing only comparatively small amounts of these "combustion retarders", usually about 1 to 5%, with the vanadium oxide, as the use of comparatively large amounts of these materials defeats the desired end by greatly increasing the complete combustion of the methyl alcohol and decreasing the formaldehyde formation.

As examples of catalyst composition in which these "combustion retarders" have been admixed with vanadium oxide, I shall cite the following examples, to which, however, I do not wish to limit myself as the compositions may be considerably varied without departing from the scope and spirit of this invention:

70% vanadium oxide ($V_2O_5$) and 30% manganese oxide ($Mn_3O_4$);
98.8% vanadium oxide ($V_2O_5$) and 1.2% sodium oxide ($Na_2O$);
98.6% vanadium oxide ($V_2O_5$) and 1.4% potassium oxide ($K_2O$);
98.75% vanadium oxide ($V_2O_5$) and 1.25% lithium oxide ($Li_2O$);
98.75% vanadium oxide ($V_2O_5$) and 1.25% magnesium oxide ($Mg_2O$);
98.8% vanadium oxide ($V_2O_5$) and 1.2% barium oxide ($BaO$);
97% vanadium oxide ($V_2O_5$) and 3% cerium oxide ($CeO_2$);
97% vanadium oxide ($V_2O_5$) and 3% strontium oxide ($SrO$);
98% vanadium oxide ($V_2O_5$) and 2% calcium oxide ($CaO$);
97% vanadium oxide ($V_2O_5$) and 3% nickel oxide ($Ni_2O_3$);
97% vanadium oxide ($V_2O_5$) and 3% tin oxide ($SnO$);
97% vanadium oxide ($V_2O_5$) and 3% silver oxide ($Ag_2O$);
97.5% vanadium oxide ($V_2O_5$) and 2.5% lead oxide ($PbO$);
97% vanadium oxide ($V_2O_5$) and 3% phosphorus oxide ($P_2O_5$);
97.8% vanadium oxide ($V_2O_5$) and 2.2% thorium oxide ($ThO_2$);
97% vanadium oxide ($V_2O_5$) and 3% lanthanum oxide ($La_2O_5$).

Various combinations of these "combustion retarders" with vanadium oxide were also tried and found to be very efficacious, such being:

*Example I*

95.5% vanadium oxide ($V_2O_5$)
1.5% potassium oxide ($K_2O$)
3.0% manganese oxide ($Mn_3O_4$)

*Example II*

94.0% vanadium oxide ($V_2O_5$)
3.0% tin oxide (SnO)
3.0% nickel oxide ($Ni_2O_3$)

*Example III*

95.0% vanadium oxide ($V_2O_5$)
2.0% potassium oxide ($K_2O$)
3.0% lanthanum oxide ($La_2O_5$)

In all of the above examples the percentage composition given is based on the oxide formulæ stated in the parentheses. These catalysts consisting of vanadium oxide and the "combustion retarder" may be employed without a carrier or as a coating on carriers such as asbestos, pumice, or aluminum, but it is essential that the component oxides constituting a catalyst should be in the most minutely divided state possible and in intimate contact with each other.

My invention will be further described in connection with the following example. A mixture of approximately 18 parts air to 1.0 part of methyl alcohol in the vapor form by weight is passed through a catalyst consisting of crushed silica containing a coating of 98.75% vanadium oxide ($V_2O_5$) and 1.25% magnesium oxide (MgO) held at a temperature of 310° C. and maintaining a time of contact of the air-alcohol mixture with the catalyst of 0.4 second. The products of the reaction with the very small amount of unreacted methyl alcohol may be condensed to form solid paraformaldehyde or scrubbed out by passage through water scrubbers.

It will be evident that the various conditions of the reaction may be widely varied, such as the pressure at which the reaction is carried out, the time of contact, the ratio of air to alcohol, the use of other oxygen containing gases, the catalyst temperature, and the choice of the catalyst.

Having now described my invention, I claim:

1. The process of producing formaldehyde comprising passing methyl alcohol in the vapor phase and air into contact with a catalyst consisting of vanadium oxide and a "combustion retarder".

2. The process of producing formaldehyde comprising passing methyl alcohol in the vapor phase and air into contact with a catalyst consisting of vanadium oxide and two or more "combustion retarders".

3. The process of producing formaldehyde comprising passing methyl alcohol in the vapor phase and air into contact with a catalyst consisting of vanadium oxide and a metallic oxide of the first group of the periodic system which latter oxide is employed as a "combustion retarder".

4. The process of producing formaldehyde comprising passing methyl alcohol in the vapor phase and air into contact with a catalyst consisting of vanadium oxide and potassium oxide.

5. The process of producing formaldehyde comprising passing methyl alcohol in the vapor phase and air into contact with a catalyst consisting of vanadium oxide and potassium oxide and an oxide of another metal, which latter two oxides are employed as "combustion retarders".

6. The process of producing formaldehyde comprising passing methyl alcohol in the vapor phase and air into contact with a catalyst consisting of vanadium oxide, potassium oxide and manganese oxide.

7. The process of producing formaldehyde comprising passing methyl alcohol in the vapor phase and air into contact with a catalyst consisting of vanadium oxide and not more than 5% of potassium oxide.

8. The process of producing formaldehyde comprising passing methyl alcohol in the vapor phase and air into contact with a catalyst consisting of 98.6% of vanadium oxide and 1.4% of potassium oxide.

9. The process of producing formaldehyde comprising passing methyl alcohol in the vapor phase and air into contact with a catalyst consisting of vanadium oxide, not more than 5% of potassium oxide and not more than 5% of manganese oxide.

10. The process of producing formaldehyde comprising passing methyl alcohol in the vapor phase and air into contact with a catalyst consisting of 95.5% vanadium oxide, 1.5% potassium oxide and 3.0% manganese oxide.

In testimony whereof, I hereby affix my signature.

AUGUSTUS EDWARD CRAVER.